United States Patent
Frank et al.

(10) Patent No.: US 11,539,889 B2
(45) Date of Patent: Dec. 27, 2022

(54) METHOD FOR THE NOISE OPTIMIZATION OF A CAMERA, IN PARTICULAR A HANDHELD THERMAL IMAGING CAMERA

(71) Applicant: Robert Bosch GmbH, Stuttgart (DE)

(72) Inventors: Michael Frank, Bretten (DE); Daniel Marquardt, Neuhausen auf den Fildern (DE); Axel Rumberg, Karlsruhe (DE); Mike Uhlig, Stuttgart (DE); Patrick Meyer, Leinfelden-Echterdingen (DE); Tatiana Babkina, Leinfelden-Echterdingen (DE)

(73) Assignee: Robert Bosch GmbH, Stuttgart (DE)

(*) Notice: Subject to any disclaimer, the term of this patent is extended or adjusted under 35 U.S.C. 154(b) by 419 days.

(21) Appl. No.: 16/338,580

(22) PCT Filed: Aug. 8, 2017

(86) PCT No.: PCT/EP2017/070059
§ 371 (c)(1),
(2) Date: Apr. 1, 2019

(87) PCT Pub. No.: WO2018/065143
PCT Pub. Date: Apr. 12, 2018

(65) Prior Publication Data
US 2020/0045231 A1    Feb. 6, 2020

(30) Foreign Application Priority Data
Oct. 6, 2016 (DE) .................. 10 2016 219 391.0

(51) Int. Cl.
*H04N 5/232* (2006.01)

(52) U.S. Cl.
CPC ..... *H04N 5/23277* (2013.01); *H04N 5/23261* (2013.01)

(58) Field of Classification Search
CPC .. H04N 5/23277; H04N 5/23261; H04N 5/33; H04N 5/23254; H04N 5/23258;
(Continued)

(56) References Cited

U.S. PATENT DOCUMENTS 5,475,420 A * 12/1995 Buchin ............... A61B 1/0005
                                                          348/65
7,153,268 B2 * 12/2006 Li ....................... G01S 15/8995
                                                          382/128
(Continued)

FOREIGN PATENT DOCUMENTS

| CN | 101919236 A | 12/2010 |
| CN | 107005808 A | 8/2017 |

(Continued)

OTHER PUBLICATIONS

International Search Report corresponding to PCT Application No. PCT/EP2017/070059, dated Oct. 9, 2017 (German and English language document) (7 pages).

*Primary Examiner* — Michael E Teitelbaum
(74) *Attorney, Agent, or Firm* — Maginot, Moore & Beck LLP

(57) ABSTRACT

The disclosure relates to a method for the noise optimization of a camera, in particular a handheld thermal imaging camera. Images are captured by means of the camera in at least one method step; at least one movement characteristic variable is detected by means of at least one sensor unit of the camera in at least one method step; and image data of captured images is averaged by means of a computing unit of the camera in at least one method step. At least a number of images to be averaged are determined by means of the computing unit of the camera at least on the basis of an intensity of the detected movement characteristic variable, in particular a change rate, in at least one method step.

19 Claims, 3 Drawing Sheets

(58) Field of Classification Search
CPC ......... H04N 5/23264; H04N 5/23248; G03B 2217/005; G06T 2207/10016; G06T 2207/20182; G06T 2207/20221; G06T 5/002; G06T 5/50
See application file for complete search history.

(56) References Cited

U.S. PATENT DOCUMENTS

| | | | |
|---|---|---|---|
| 9,807,339 B2* | 10/2017 | Chen | G06V 20/62 |
| 10,152,811 B2* | 12/2018 | Johnson | G06T 11/60 |
| 2008/0170123 A1* | 7/2008 | Albertson | A63B 24/0003 348/157 |
| 2009/0185266 A1 | 7/2009 | Stromberg et al. | |
| 2013/0028477 A1* | 1/2013 | Schmieder | H04N 5/23254 382/103 |
| 2013/0155248 A1* | 6/2013 | Neeley | H04N 5/33 348/159 |
| 2013/0155249 A1* | 6/2013 | Neeley | H04N 5/33 348/159 |
| 2013/0162835 A1* | 6/2013 | Forland | H04N 5/332 348/164 |
| 2013/0321638 A1* | 12/2013 | Stratmann | H04N 5/23245 348/162 |
| 2014/0160299 A1* | 6/2014 | Mumaw | G01J 5/08 348/164 |
| 2014/0176725 A1* | 6/2014 | Stuart | G01J 5/089 348/164 |
| 2014/0267757 A1* | 9/2014 | Abramson | G02B 7/28 348/164 |
| 2015/0022667 A1* | 1/2015 | McManus | H04N 5/23222 348/164 |
| 2015/0062346 A1 | 3/2015 | Fraden | |
| 2015/0261996 A1* | 9/2015 | Kim | G06K 9/00255 348/14.03 |
| 2015/0269742 A1* | 9/2015 | Bergstrom | G06T 5/50 348/164 |
| 2015/0348242 A1* | 12/2015 | Molgaard | G06T 11/60 348/241 |
| 2016/0057369 A1* | 2/2016 | Wolfe | H04N 5/33 348/322 |
| 2019/0328238 A1* | 10/2019 | Achilefu | G06T 7/0012 |

FOREIGN PATENT DOCUMENTS

| | | |
|---|---|---|
| EP | 1 641 246 A1 | 3/2006 |
| EP | 1 993 280 A2 | 11/2008 |
| EP | 2 642 262 A2 | 9/2013 |
| JP | 2005-348178 A | 12/2005 |

* cited by examiner

METHOD FOR THE NOISE OPTIMIZATION OF A CAMERA, IN PARTICULAR A HANDHELD THERMAL IMAGING CAMERA

This application is a 35 U.S.C. § 371 National Stage Application of PCT/EP2017/070059, filed on Aug. 8, 2017, which claims the benefit of priority to Serial No. DE 10 2016 219 391.0, filed on Oct. 6, 2016 in Germany, the disclosures of which are incorporated herein by reference in their entirety.

BACKGROUND

Methods for noise optimization of a camera, in particular of a handheld thermal imaging camera, are already known, wherein the camera is used in the known methods in at least one method step to capture images, wherein at least one movement characteristic is captured in at least one method step using at least one sensor unit of the camera and wherein averaging of image data of captured images is performed in at least one method step using a computational unit of the camera.

SUMMARY

The disclosure proceeds from a method for noise optimization of a camera, in particular of a handheld thermal imaging camera, wherein the camera is used in at least one method step to capture images, wherein at least one movement characteristic is captured in at least one method step using at least one sensor unit of the camera and wherein averaging of image data of captured images is performed in at least one method step using a computer unit of the camera.

It is proposed to determine in at least one method step at least in dependence on an intensity, in particular on a rate of change, of the captured movement characteristic at least one number of images to be averaged using the computational unit of the camera. It is advantageously possible hereby to achieve a noise reduction that is dependent on a movement of the camera. Advantageously, improved image quality, in particular in the case of a small movement of the camera, can be achieved. It is advantageously possible to achieve low computational complexity for noise reduction.

The camera preferably has at least one image capturing unit which is provided for capturing at least one image, in particular one thermal image, of an environment and/or of an object. "Provided" is intended to be understood to mean in particular specially programmed, designed and/or equipped. An object being provided for a specific function is to be understood to mean in particular that the object satisfies and/or performs this specific function in at least one application and/or operating state. The at least one image capturing unit particularly preferably comprises at least one infrared image sensor, in particular a focal plane array (FPA). The image capturing unit is preferably provided for detection at least of electromagnetic radiation. The image capturing unit is preferably provided for detection of light, in particular of infrared light, preferably of infrared light from a wavelength range from 780 nm to 50 000 nm. The image capturing unit preferably has at least one imaging optical element, in particular a lens, an objective lens, a Fresnel lens or a further imaging optical element that appears useful to a person skilled in the art. The imaging optical element is preferably provided for imaging electromagnetic radiation incident on the imaging optical element, in particular infrared light, from the environment and/or the object onto the infrared image sensor. The infrared image sensor preferably converts the incoming, in particular imaged, electromagnetic radiation, in particular the infrared light, in the image of the environment and/or of the object into corresponding image data, in particular into electronic image data.

A "sensor unit" in this context is to be understood to mean in particular a unit that is provided for recording at least one characteristic and/or a physical property, wherein the recording may be performed actively, for example in particular by creating and emitting an electrical measurement signal, and/or passively, for example in particular by capturing property changes of a sensor component. The sensor unit preferably has at least one sensor element which is provided for capturing at least one movement characteristic. The sensor unit preferably utilizes in at least one operating state the image capturing unit as an additional sensor element for capturing the movement characteristic. The image capturing unit is preferably at least partially embodied in one piece with the sensor unit. "At least partially in one piece" in this context is to be understood to mean in particular that at least one component of at least one object and/or at least one first object is embodied in one piece with at least one component of at least one further object and/or in one piece with at least one further object. The, in particular captured, movement characteristic preferably takes the form of a spatial position, a spatial orientation, a speed, an acceleration, a temperature change, a brightness change, or a further movement characteristic that appears useful to a person skilled in the art. The at least one movement characteristic preferably characterizes a movement, in particular a translational movement, a rotational movement, a jiggle and/or a vibration, of the camera, in particular a movement relative to an environment and/or to an object, preferably a movement relative to the environment that is to be captured using the image capturing unit and/or relative to the object to be captured using the image capturing unit. The movement characteristic, in particular an intensity of the movement characteristic, is preferably embodied to be quantifiable. The movement characteristic, in particular the intensity of the movement characteristic, is particularly preferably embodied to be quantifiable as a numerical, in particular digital, value. "Intensity of a characteristic" is to be understood to mean in particular a quantitative extent, an absolute value, an order of magnitude, a measured value, or a further quantitative property of the characteristic that appears useful to a person skilled in the art.

The camera preferably has at least one computational unit which is provided for processing at least one image captured using the image capturing unit, in particular using the infrared image sensor, in particular a thermal image, of the environment and/or of an object, in particular for noise optimization. The computational unit is preferably provided for processing image data, in particular electronic image data, for noise optimization, in particular averaging. "Computational unit" is to be understood to mean in particular a unit having an information input, information processing capability, and an information output. The computational unit advantageously has at least a processor, a memory, input and output means, further electrical components, an operating program, closed-loop control routines, open-loop control routines, and/or calculation routines. The components of the computational unit are preferably arranged on a common printed circuit board and/or are advantageously arranged in a common housing. The computational unit is preferably provided for evaluating the movement characteristic, which is captured in particular using the sensor unit. The computational unit preferably determines the intensity of the movement characteristic. The computational unit with particular preference determines at least in dependence on the movement characteristic, in particular the intensity of the movement characteristic, at least one averaging function for averaging at least two images, in particular image data, captured using the camera, in particular the image capturing unit. The computational unit is preferably used to perform the averaging function for averaging at least two images, in particular image data, captured using the camera, in particular the image capturing unit. The computational unit with particular preference determines the averaging function in at least one operating state in dependence on the movement characteristic, in particular the intensity of the movement characteristic. The averaging function preferably comprises at least one function step for calculating a mean, a moving average, a weighted average, or a further average value that appears useful to a person skilled in the art of the at least two images to be averaged, in particular of image data of the at least two images to be averaged. In at least one method step, images captured using the camera are with particular preference averaged, in particular using the averaging function, wherein a total number of the captured images is equal to the number of images to be averaged. It is conceivable that the at least one averaging function is specifiable and/or performable by a user of the camera, in particular using an operating unit of the camera.

It is furthermore proposed to change, in particular automatically, in at least one method step the number of images to be averaged in the case of a change in the intensity of the captured movement characteristic. Hereby, a movement-adaptive noise reduction can be advantageously achieved. It is advantageously possible to achieve noise reduction that is dependent on a movement of the camera. The number of images to be averaged is preferably calculated from the intensity of the movement characteristic, in particular the change in the intensity of the movement characteristic, in particular using the computational unit, and is preferably calculated automatically using the computation unit. It is conceivable that the number of images to be averaged is calculated from an increase, a gradient, a rate of change, a variable speed, or a further measure of the change in the intensity of the movement characteristic which appears useful to a person skilled in the art. The number of images to be averaged, in particular starting from a number greater than one, is preferably reduced in the case of an increase of the intensity of the movement characteristic, in particular to one. The number of images to be averaged, in particular starting from a number of at least one, is preferably increased in the case of a drop in the intensity of the movement characteristic, in particular to two or an integer greater than two. For example, it is conceivable that the number of images to be averaged is determined proportionally to a rate of change of an intensity of the movement characteristic which takes the form of a spatial position of the camera, with the result that in particular the number of images to be averaged is increased depending on the change per second of the spatial position of the camera. For example, the number of images to be averaged is increased by one depending on the change per second of the spatial position of the camera. Other refinements of determining the number of images to be averaged from the intensity of the movement characteristic are conceivable, and the disclosure presented here is not intended to be limited to the abovementioned examples. Alternatively or additionally, it is conceivable that the number of images to be averaged is determined in dependence on the intensity of the movement characteristic exceeding and/or not reaching at least one threshold value. It is conceivable that the number of images to be averaged is decreased, in particular starting from a number greater than one, in the case of the intensity of the movement characteristic not reaching the at least one threshold value, in particular decreased to one. It is furthermore conceivable that the number of images to be averaged is increased, in particular starting from a number of at least one, if the intensity of the movement characteristic does not reach the at least one threshold value, in particular increased to two or to an integer greater than two. For example, it is conceivable that the number of images to be averaged is increased from one to two if an intensity of the movement characteristic which takes the form of an absolute value of a speed of the camera does not reach a threshold value of 1 m/s. For example, it is furthermore conceivable that the number of images to be averaged is reduced to one if the intensity of the movement characteristic which takes the form of an absolute value of the speed of the camera exceeds the threshold value of 1 m/s. Further refinements, in particular of the at least one threshold value, are conceivable, and in particular, the disclosure presented here is not intended to be limited to the abovementioned examples.

It is furthermore proposed that in at least one method step at least one image repetition rate, in particular of a display unit and/or of a sensor unit, of the camera is determined in dependence on the movement characteristic. It is advantageously possible hereby to achieve low-noise presentation of an image captured using the camera. It is advantageously possible to achieve noise reduction that is dependent on a movement of the camera. An "image repetition rate of a camera" is to be understood to mean in particular a rate, preferably a frequency, at which the camera captures images and/or displays captured, in particular averaged, images. The image repetition rate preferably has a value of greater than 10 Hz, preferably greater than 25 Hz, with particular preference greater than 50 Hz. It is conceivable that the display unit of the camera has an image repetition rate that differs from an image repetition rate of the sensor unit of the camera. Alternatively, it is conceivable that the display unit and the sensor unit have the same image repetition rate. The image repetition rate of the display unit and/or of the sensor unit is preferably determined in dependence on the intensity of the movement characteristic. The image repetition rate of the display unit and/or of the sensor unit is preferably calculated using the intensity of the movement characteristic. The image repetition rate of the display unit is preferably reduced, starting from a value of greater than 10 Hz, in the case of a drop in the intensity of the movement characteristic, in particular reduced to 10 Hz. The image repetition rate of the display unit is preferably increased in the case of an increase in the intensity of the movement characteristic. It is conceivable that an image repetition rate of the sensor unit is reduced in the case of a drop in the intensity of the movement characteristic. It is furthermore conceivable that an image repetition rate of the sensor unit is increased in the case of an increase in the intensity of the movement characteristic.

It is furthermore proposed that the sensor unit has at least one light sensor element, in particular a camera operating in the visual and/or infrared light spectrum, which is provided to capture a movement characteristic which takes the form of an optical difference, in particular a pixel shift, between at least two images captured using the camera. It is advantageously possible hereby to detect a movement of the camera on the basis of captured images for movement-adaptive noise optimization. It is advantageously possible to achieve noise reduction that is dependent on a movement of the camera. The light sensor element is preferably embodied in the form of at least one further camera, in particular a further camera operating in the visual and/or infrared light spectrum. It is conceivable that the light sensor element is embodied as one unit with the image capturing unit. The light sensor element is preferably provided for spatially resolved imaging of at least one spatial region, in particular the environment of the camera, preferably the environment of the camera that is captured using the image capturing unit. With particular preference, the light sensor element and the image capturing unit each capture an image of the environment at least substantially at the same time. "Substantially at the same time" is to be understood to mean in particular that a time interval between a capturing time of an image of the light sensor element and a capturing time of an image of the image capturing unit is preferably shorter than 10 ms, preferably shorter than 2 ms, with particular preference shorter than 1 ms. "At least substantially" in this context is to be understood to mean in particular that a deviation from a specified value is in particular less than 25%, preferably less than 10% and with particular preference less than 5% of the specified value. The capturing time of the image of the light sensor element is preferably identical to the capturing time of the image of the image capturing unit. The sensor unit preferably transmits the image of the light sensor for an evaluation to the computational unit. The computational unit preferably performs feature recognition of at least one image feature, in particular an edge, a corner, a pattern, an area, a color or a further image feature of the image of the light sensor element that appears useful to a person skilled in the art. The computational unit preferably determines at least one position of the image feature in the image of the light sensor element relative to a position of the image feature in a further image of the light sensor element that is captured in particular temporally before the image of the light sensor element. With particular preference, the computational unit determines a spatial distance of the position of the image feature in the image of the light sensor element from the position of the image feature in the further image of the light sensor element that is captured in particular temporally before the image of the light sensor element. The spatial distance preferably takes the form of a pixel shift.

It is furthermore proposed that the sensor unit has at least one temperature sensor element, in particular a thermopile, which is provided to capture a movement characteristic which takes the form of at least one temperature change. Hereby, a movement of the camera relative to a heat source and/or a heat sink can be advantageously detected for movement-adaptive noise optimization. It is advantageously possible to achieve noise reduction that is dependent on a movement of the camera. It is conceivable that the temperature sensor element is embodied in the form of a focal plane array, a thermocouple, a thermometer or a further temperature sensor element that appears useful to a person skilled in the art. The temperature sensor element is preferably embodied in the form of a thermopile. The temperature sensor element preferably captures at least one time profile of the temperature, in particular the temperature change. The computational unit preferably determines the number of images to be averaged using the temperature change. It is conceivable that the computational unit changes the number of images to be averaged proportionally or inversely proportionally to the temperature change or in accordance with a further mathematical dependence on the temperature change that appears useful to a person skilled in the art.

It is furthermore proposed that the sensor unit has at least one brightness sensor element, in particular a camera operating in the visual spectrum, which is provided to capture at least one movement characteristic which takes the form of at least one brightness change. It is advantageously possible hereby to detect a movement of the camera relative to a light-emitting or light-absorbing object for movement-adaptive noise optimization. It is advantageously possible to achieve noise reduction that is dependent on a movement of the camera. It is conceivable that the brightness sensor element is embodied in the form of an additional camera, in particular an additional camera operating in the visual spectrum, of a light-sensitive pixel or of a further brightness sensor element which appears useful to a person skilled in the art. It is furthermore conceivable that the brightness sensor element is embodied in one unit with the image capturing unit and/or the light sensor element. It is furthermore conceivable that the image capturing unit and/or the light sensor element are utilizable as brightness sensor element. The brightness sensor element preferably captures at least one temporal profile of a brightness, in particular the brightness change. The computational unit preferably determines the number of images to be averaged using the brightness change. It is conceivable that the computational unit changes the number of images to be averaged proportionally or inversely proportionally to the brightness change or in accordance with a further mathematical dependence on the brightness change that appears useful to a person skilled in the art.

It is furthermore proposed that the sensor unit has at least one position sensor element and/or a movement sensor element, in particular a GPS sensor, a speed sensor element, an inertial sensor element and/or a rotational speed sensor element, which is provided to capture at least one movement characteristic which takes the form of a spatial position, a speed, a rotational speed and/or an acceleration of the camera. It is advantageously possible hereby to directly measure a movement of the camera for movement-adaptive noise optimization. It is advantageously possible to achieve noise reduction that is dependent on a movement of the camera.

Furthermore, a camera, in particular a handheld thermal imaging camera, is proposed, having at least one image capturing unit, which is provided to capture at least one image, in particular a thermal image, of an environment, having at least one sensor unit, which is provided to capture at least one movement characteristic, and having at least one computational unit, which is provided to process the at least one movement characteristic for noise optimization, in particular in accordance with a method of the disclosure, wherein at least one number of images to be averaged, captured by the camera, is determined using the computational unit at least in dependence on an intensity, in particular a rate of change, of the movement characteristic. It is advantageously possible hereby to provide a camera that permits noise reduction dependent on a movement of the camera. It is advantageously possible to provide a camera with improved image quality, in particular in the case of a small movement of the camera. It is advantageously possible to provide a camera with a noise reduction function that is easy to calculate.

It is furthermore proposed that at least one sensor unit has at least one inertial sensor element which is provided to capture a movement characteristic which takes the form of acceleration and/or rotational speed. It is advantageously possible hereby to directly measure a movement of the camera using the inertial sensor element for movement-adaptive noise optimization. It is advantageously possible to provide a camera which permits noise reduction that is dependent on a movement of the camera.

It is furthermore proposed that the at least one sensor unit has at least one magnetic field sensor element which is provided to capture a movement characteristic which takes the form of a spatial orientation change relative to a magnetic field, in particular Earth's magnetic field. It is advantageously possible hereby to measure a movement of the camera relative to a magnetic field using the magnetic field sensor element for movement-adaptive noise optimization. It is advantageously possible to provide a camera that permits noise reduction that is dependent on a movement of the camera.

The method according to the disclosure and/or the camera according to the disclosure are/is not intended to be limited here to the above-described application and embodiment. In particular, the method according to the disclosure and/or the camera according to the disclosure can have a number of individual elements, components and units and method steps that deviates from a number mentioned here to meet a function described herein. The disclosed features of the camera according to the disclosure should analogously be read on to the method. In addition, regarding the value ranges given in this disclosure, the values within the mentioned limits should also be taken as disclosed and usable as desired.

BRIEF DESCRIPTION OF THE DRAWINGS

Further advantages are apparent from the following description of the drawings. The drawings show an exemplary embodiment of the disclosure. The drawings and the description contain numerous features in combination. A person skilled in the art will also expediently consider the features individually, if appropriate, and combine them to form useful further combinations.

In the figures.

DETAILED DESCRIPTION

Figure 1:
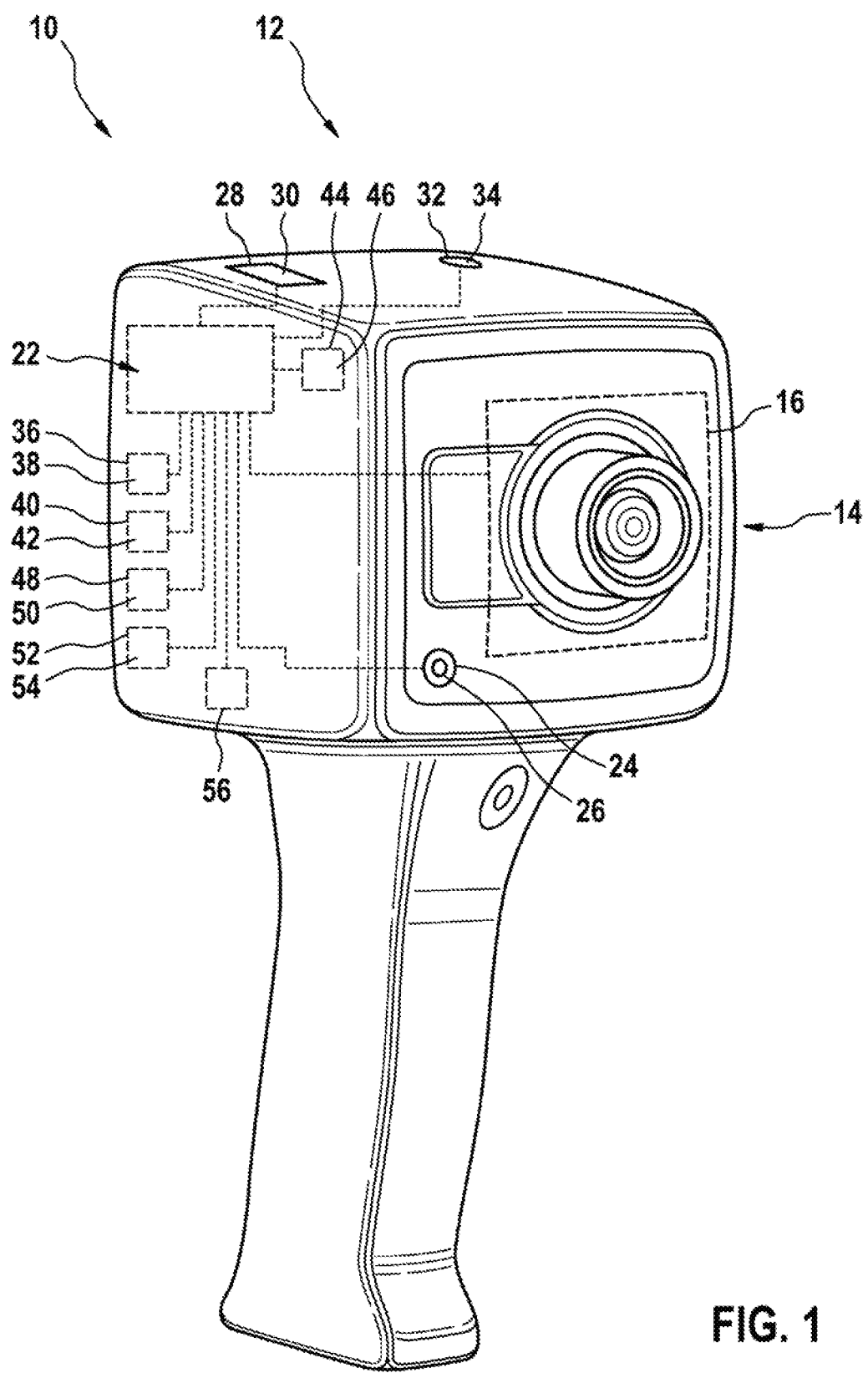
FIG. 1 shows a perspective front view of a camera in a schematic illustration.
Figure 2:
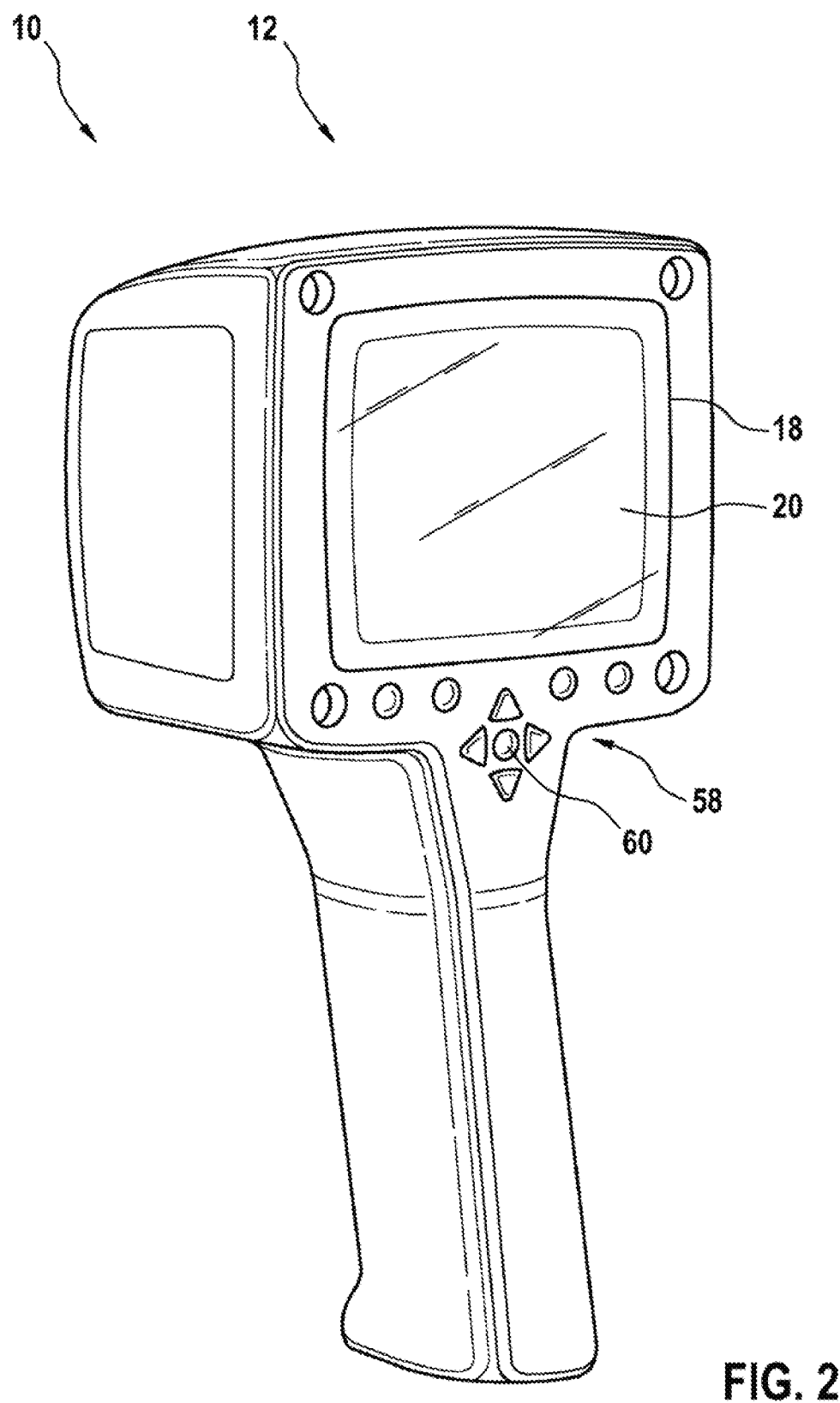
FIG. 2 shows a perspective rear view of the camera from FIG. 1 in a schematic illustration.

FIGS. 1 and 2 illustrate an exemplary embodiment of a camera 10. The camera 10 is embodied in the form of a handheld thermal imaging camera 12. The camera 10 has an image capturing unit 14, which captures in at least one operating state an image, in particular a thermal image, of an environment of the camera 10. The image capturing unit 14 comprises an infrared image sensor 16. The infrared image sensor 16 is embodied in the form of a focal plane array.

The camera 10 has a display unit 18. The display unit 18 is embodied in the form of a display 20. The display unit 18 displays in at least one operating state the image, in particular the thermal image. The display unit 18 displays in at least one operating state an averaged image, in particular an averaged thermal image. The display unit 18 displays images, in particular thermal images, with an image repetition rate of greater than 10 Hz.

The camera 10 has a sensor unit 22. The sensor unit 22 captures in at least one operating state a movement characteristic. The sensor unit 22 captures in at least one operating state the movement characteristic at least substantially at the same time as an image is captured using the image capturing unit 14. The sensor unit 22 in at least one operating state captures the movement characteristic continuously.

The sensor unit 22 has a light sensor element 24. The light sensor element 24 is embodied in the form of a VIS camera 26 operating in the visual spectrum. The light sensor element 24 captures in at least one operating state a movement characteristic which takes the form of an optical difference, in particular a pixel shift, between at least two images captured using the camera 10. The sensor unit 22 is connected to the image capturing unit 14 for transmitting, in particular captured, images, in particular thermal images, by way of an electric connection, in particular an electronic data link.

The sensor unit 22 has a temperature sensor element 28. The temperature sensor element 28 is embodied in the form of a thermopile 30. The temperature sensor element 28 captures in at least one operating state a movement characteristic which takes the form of a temperature change.

The sensor unit 22 has a brightness sensor element 32. The brightness sensor element 32 is embodied in the form of a light-sensitive pixel 34. The brightness sensor element 32 captures in at least one operating state a movement characteristic which takes the form of a brightness change.

The sensor unit 22 has a position sensor element 36. The position sensor element 36 is embodied in the form of a GPS sensor 38. The position sensor element 36 captures in at least one operating state a movement characteristic which takes the form of a spatial position.

The sensor unit 22 has a further position sensor element 40. The further position sensor element 40 is embodied in the form of a magnetic field sensor element 42. The further position sensor element 40 captures in at least one operating state a movement characteristic which takes the form of a spatial orientation change relative to a magnetic field, in particular Earth's magnetic field.

The sensor unit 22 has a movement sensor element 44. The movement sensor element 44 is embodied in the form of a speed sensor element 46. The movement sensor element 44 captures in at least one operating state a movement characteristic which takes the form of a speed.

The sensor unit 22 has a further movement sensor element 48. The further movement sensor element 48 is embodied in the form of an inertial sensor element 50. The further movement sensor element 48 captures in at least one operating state a movement characteristic which takes the form of an acceleration and/or a rotational speed.

The sensor unit 22 has an additional movement sensor element 52. The additional movement sensor element 52 is embodied in the form of a rotational speed sensor element 54. The additional movement sensor element 48 captures in at least one operating state a movement characteristic which takes the form of a rotational speed.

The camera 10 has a computational unit 56. The computational unit 56 processes in at least one operating state the captured movement characteristic for noise optimization of the camera 10. The computational unit 56 determines in at least one operating state at least one number of images to be averaged, captured using the camera 10, in dependence on an intensity, in particular a rate of change. The computational unit 56 is connected to the sensor unit 22 for transmitting sensor data using an electrical connection, in particular an electronic data link. The computational unit 56 evaluates in at least one operating state the movement characteristic captured by the sensor unit 22 and/or the images captured by the image capturing unit 14, in particular thermal images. The computational unit 56 determines in at least one operating state at least one averaging function for averaging image data in dependence on the movement characteristic captured by the sensor unit 22 and/or on the images captured by the image capturing unit 14, in particular thermal images. The computational unit 56 performs in at least one operating state the at least one averaging function.

The camera 10 has an operating unit 58. The operating unit 58 comprises an operating element 60. The operating element 60 is embodied in the form of an operating field. The at least one averaging function is performable using the operating unit 58. The, in particular captured and/or averaged, image, in particular the thermal image, is storable using the operating unit 58.

Figure 3:
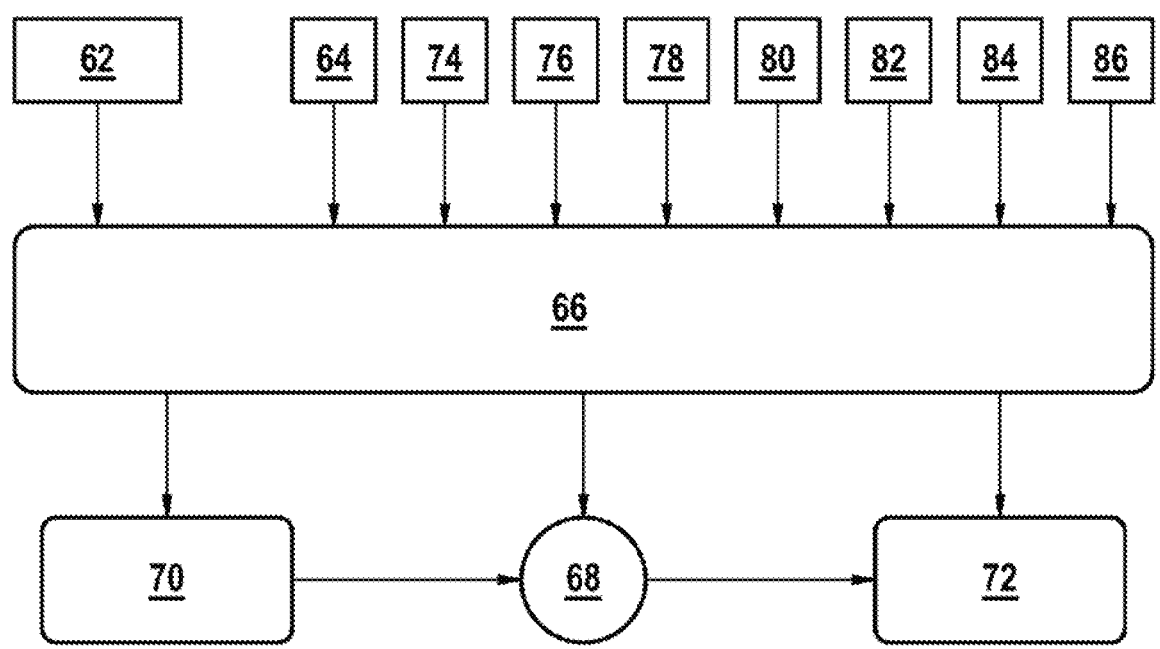
FIG. 3 shows a flowchart of a method for noise optimization of a camera.

FIG. 3 illustrates a flowchart of a method for noise optimization of the camera 10. In at least one method step 62, images, in particular thermal images, are captured using the camera 10.

In at least one method step 64, at least one movement characteristic is captured using the sensor unit 22 of the camera 10. The sensor unit 22 transmits the captured movement characteristic to the computational unit 56 for evaluation. The computational unit 56 determines an intensity of the captured movement characteristic. The computational unit 56 determines an averaging function for averaging images, captured using the camera 10, in dependence on the captured movement characteristic. The computational unit 56 determines an averaging function for averaging images, captured using the camera 10, in dependence on the intensity of the captured movement characteristic.

In at least one method step 74, a movement characteristic which takes the form of an optical difference, in particular a pixel shift, between at least two images captured using the camera 10 is captured using the light sensor element 24. The sensor unit 22 transmits the captured movement characteristic which takes the form of an optical difference to the computational unit 56 for evaluation. The computational unit 56 determines an intensity, which takes the form of an absolute value of a pixel shift, of the captured movement characteristic which takes the form of an optical difference. The computational unit 56 determines an averaging function for averaging images, captured using the camera 10, in dependence on the captured optical difference. The computational unit 56 determines an averaging function for averaging images, captured using the camera 10, in dependence on the absolute value of the pixel shift.

In at least one method step 76, a movement characteristic which takes the form of at least one temperature change is captured using the temperature sensor element 28. The sensor unit 22 transmits the captured temperature change to the computational unit 56 for evaluation. The computational unit 56 determines an intensity of the captured movement characteristic which takes the form of an absolute value of the temperature change. The computational unit 56 determines an averaging function for averaging images, captured using the camera 10, in dependence on the captured temperature change. The computational unit 56 determines an averaging function for averaging images, captured using the camera 10, in dependence on the absolute value of the temperature change.

In at least one method step 78, a movement characteristic which takes the form of at least one brightness change is captured using the brightness sensor element 32. The sensor unit 22 transmits the captured brightness change to the computational unit 56 for evaluation. The computational unit 56 determines an intensity of the captured movement characteristic which takes the form of an absolute value of the brightness change. The computational unit 56 determines an averaging function for averaging images, captured using the camera 10, in dependence on the captured brightness change. The computational unit 56 determines an averaging function for averaging images, captured using the camera 10, in dependence on the absolute value of the brightness change.

In at least one method step 80, a movement characteristic which takes the form of a spatial position of the camera 10 is captured using the, in particular further, position sensor element 36, 40. The sensor unit 22 transmits the captured spatial position of the camera 10 to the computational unit 56 for evaluation. The computational unit 56 determines an intensity of the captured movement characteristic which takes the form of a change in the spatial position of the camera 10. The computational unit 56 determines an averaging function for averaging images, captured using the camera 10, in dependence on the captured spatial position of the camera 10. The computational unit 56 determines an averaging function for averaging images, captured using the camera 10, in dependence on the change in the spatial position over time.

In at least one method step 82, a movement characteristic which takes the form of a speed of the camera 10 is captured using the movement sensor element 44. The sensor unit 22 transmits the captured speed to the computational unit 56 for evaluation. The computational unit 56 determines an intensity of the captured movement characteristic which takes the form of an absolute value of the speed. The computational unit 56 determines an averaging function for averaging images, captured using the camera 10, in dependence on the captured speed. The computational unit 56 determines an averaging function for averaging images, captured using the camera 10, in dependence on the absolute value of the speed.

In at least one method step 84, a movement characteristic which takes the form of a rotational speed of the camera 10 is captured using the, in particular further or additional, movement sensor element 48, 52. The sensor unit 22 transmits the captured rotational speed to the computational unit 56 for evaluation. The computational unit 56 determines an intensity of the captured movement characteristic which takes the form of an absolute value of the rotational speed. The computational unit 56 determines an averaging function for averaging images, captured using the camera 10, in dependence on the captured rotational speed. The computational unit 56 determines an averaging function for averaging images, captured using the camera 10, in dependence on the absolute value of the rotational speed.

In at least one method step 86, a movement characteristic which takes the form of an acceleration of the camera 10 is captured using the, in particular further, movement sensor element 44, 48. The sensor unit 22 transmits the captured acceleration to the computational unit 56 for evaluation. The computational unit 56 determines an intensity of the captured movement characteristic which takes the form of an absolute value of the acceleration. The computational unit 56 determines an averaging function for averaging images, captured using the camera 10, in dependence on the captured acceleration. The computational unit 56 determines an averaging function for averaging images, captured using the camera 10, in dependence on the absolute value of the acceleration.

In at least one method step 66, at least one number of images to be averaged is determined in dependence on an intensity, in particular a rate of change, of the captured movement characteristic using the computational unit 56 of the camera 10. The computational unit 56 calculates the number of images to be averaged using the intensity of the captured movement characteristic. The computational unit 56 calculates the number of images to be averaged proportionally to a change, in particular a rate of change, of the intensity of the captured movement characteristic.

In at least one method step 70, the number of images to be averaged is automatically changed in the case of a change in the intensity of the captured movement characteristic. The computational unit 56 reduces the number of images to be averaged, starting from a number greater than one, in the case of an increase in the intensity of the movement characteristic. The computational unit 56 reduces the number of images to be averaged to one in the case of a value of the intensity of the movement characteristic of zero. The computational unit 56 increases the number of images to be averaged, starting from a number of at least one, to an integer greater than one in the case of a drop in the intensity of the movement characteristic. The computational unit 56 reduces the number of images to be averaged, starting from a number greater than one, if the intensity of the movement characteristic exceeds a threshold value. The computational unit 56 increases the number of images to be averaged, starting from a number of at least one, to an integer greater than one if the intensity of the movement characteristic does not reach a further threshold value.

In at least one method step 68, averaging of image data of captured images is performed using the computational unit 56 of the camera 10. The computational unit 56 performs the averaging function, determined in dependence on the captured movement characteristic, for the images of the number of images to be averaged. The averaging function comprises at least one function step for an, in particular weighted, average value formation of the images of the number of images to be averaged. The computational unit 56 stores the result of the averaging function, in particular an averaged image and/or an averaged thermal image. The computational unit 56 transmits the averaged image and/or the averaged thermal image to the display unit 18 for output.

In at least one method step 72, an image repetition rate of the display unit 18 and/or of the sensor unit 22 of the camera 10 is determined. The computational unit 56 determines the image repetition rate of the display unit 18 in dependence on the intensity of the movement characteristic. The computational unit 56 reduces the image repetition rate of the display unit 18 starting from a value greater than 10 Hz in the case of a drop in the intensity of the movement characteristic. The computational unit 56 increases the image repetition rate of the display unit 18 starting from a value of at least 10 Hz in the case of an increase in the intensity of the movement characteristic. The display unit 18 displays images captured using the camera 10 at the image repetition rate. The display unit 18 displays images captured using the camera 10 and averaged using the computational unit 56 at the image repetition rate. The sensor unit 22 has a constant image repetition rate.

With respect to further method steps of the method for noise optimization of the camera 10, reference is made to the preceding description of the camera 10, since this description analogously also applies to the method, and consequently all features with respect to the camera 10 also count as disclosed in respect of the method for noise optimization of the camera 10.

The invention claimed is:

1. A method for noise optimization of a camera, the method comprising:
    capturing images using the camera;
    capturing at least one movement characteristic using at least one sensor device of the camera;
    determining a number of the images to be averaged using a computational device of the camera based on a rate of change of the at least one movement characteristic; and
    averaging image data of the number of the images to be averaged using the computational device of the camera,
    wherein the at least one sensor device has at least one temperature sensor element configured to capture the at least one movement characteristic in the form of at least one temperature change.

2. The method as claimed in claim 1, the determining further comprising:
    changing the number of the images to be averaged in response to a change in an intensity of the at least one movement characteristic.

3. The method as claimed in claim 1, the method further comprising:
    determining at least one image repetition rate of the camera based on the at least one movement characteristic.

4. The method as claimed in claim 1, wherein the at least one sensor device has at least one light sensor element configured to capture the at least one movement characteristic in the form of an optical difference between at least two of the images captured using the camera.

5. The method as claimed in claim 1, wherein the at least one sensor device has at least one brightness sensor element configured to capture the at least one movement characteristic in the form of at least one brightness change.

6. The method as claimed in claim 1, wherein the at least one sensor device has at least one of a position sensor element and a movement sensor element configured to capture the at least one movement characteristic in the form of at least one of a spatial position of the camera, a speed of the camera, a rotational rate of the camera, and an acceleration of the camera.

7. A camera comprising:
    at least one image capturing device configured to capture images of an environment;
    at least one sensor device configured to capture a movement characteristic; and
    at least one computational device configured to, for noise optimization:
        determine a number of the images to be averaged based on an intensity of the at least one movement characteristic;
        determining at least one image repetition rate of the camera based on the at least one movement characteristic, wherein the at least one image repetition rate is at least one of an image repetition rate of a display device of the camera and an image repetition rate of the at least one image capturing device of the camera; and
        average image data of the number of the images to be averaged camera.

8. The camera as claimed in claim 7, wherein the at least one sensor device has at least one inertial sensor element configured to capture the at least one movement characteristic in the form of at least one of an acceleration of the camera and a rotational speed of the camera.

9. The camera as claimed in claim 7, wherein the at least one sensor device has at least one magnetic field sensor element configured to capture the at least one movement characteristic in the form of a spatial orientation change relative to Earth's magnetic field.

10. The camera as claimed in claim 7, wherein the camera is a handheld thermal imaging camera and the at least one image capturing device is configured to capture thermal images of an environment.

11. The camera as claimed in claim 7, wherein the at least one computational device is configured to determine the number of the images to be averaged based a rate of change of the at least one movement characteristic.

12. The method as claimed in claim 1, wherein the camera is a handheld thermal imaging camera.

13. The method as claimed in claim 2, the determining further comprising:
automatically changing the number of the images to be averaged in response to a change in the intensity of the at least one captured movement characteristic.

14. The method as claimed in claim 3, wherein the at least one image repetition rate is at least one of an image repetition rate of a display device of the camera and an image repetition rate of the at least one sensor device of the camera.

15. The method as claimed in claim 4, wherein the at least one light sensor element is a camera configured to operate in at least one of a visual light spectrum and an infrared light spectrum and configured to capture the at least one movement characteristic in the form of a pixel shift between at least two of the images captured using the camera.

16. The method as claimed in claim 1, wherein the at least one temperature sensor element is a thermopile.

17. The method as claimed in claim 5, wherein the at least one brightness sensor element is a camera configured to operate in a visual spectrum.

18. The method as claimed in claim 6, wherein the at least one of the position sensor element and the movement sensor element is at least one of: (i) a GPS sensor configured to capture the at least one movement characteristic in the form of the spatial position of the camera, (ii) a speed sensor element configured to capture the at least one movement characteristic in the form of the speed of the camera, (iii) an inertial sensor element configured to capture the at least one movement characteristic in the form of the acceleration of the camera, and (iv) a rotational speed sensor element configured to capture the at least one movement characteristic in the form of the rotational rate of the camera.

19. A method for noise optimization of a camera, the method comprising:
capturing images using the camera;
capturing at least one movement characteristic using at least one sensor device of the camera, the at least one sensor device having at a camera configured to operate in at least one of a visual light spectrum and an infrared light spectrum and configured to capture the at least one movement characteristic in the form of a pixel shift between at least two of the images captured using the camera;
determining a number of the images to be averaged using a computational device of the camera based on an intensity of the at least one movement characteristic; and
averaging image data of the number of the images to be averaged using the computational device of the camera.

* * * * *